United States Patent
Holzapfel et al.

[11] Patent Number: 6,135,499
[45] Date of Patent: Oct. 24, 2000

[54] ADJUSTMENT DEVICE FOR A DEFLECTION FITTING OF A VEHICLE SAFETY BELT SYSTEM

[75] Inventors: Volker Holzapfel, St. Wendel; Jürgen Petzi, Geislingen-Eybach, both of Germany

[73] Assignee: TRW Occupant Restraint Systems GmbH, Alfdorf, Germany

[21] Appl. No.: 09/005,712

[22] Filed: Jan. 12, 1998

[30] Foreign Application Priority Data

Jan. 14, 1997 [DE] Germany ............. 297 00 549 0 U

[51] Int. Cl.⁷ .................................................. B60R 22/20
[52] U.S. Cl. ............................................................ 280/801.2
[58] Field of Search ............................. 280/801.2, 808, 280/806; 297/483; 188/371

[56] References Cited

U.S. PATENT DOCUMENTS

| | | | |
|---|---|---|---|
| 3,917,031 | 11/1975 | Doin et al. | 188/1 |
| 4,373,748 | 2/1983 | Reid et al. | 280/806 |
| 4,500,115 | 2/1985 | Ono | 280/808 |
| 4,652,012 | 3/1987 | Biller et al. | 280/808 |
| 4,720,147 | 1/1988 | Takada | 297/472 |
| 5,186,495 | 2/1993 | Boumarafi | 280/808 |
| 5,265,908 | 11/1993 | Verellen et al. | 280/801 A |
| 5,857,704 | 1/1999 | Biller | 280/808 |
| 5,871,235 | 2/1999 | Weir | 280/806 |
| 5,911,439 | 6/1999 | Pleyer et al. | 280/801.2 |

FOREIGN PATENT DOCUMENTS

| | | | |
|---|---|---|---|
| 2590855 | 5/1987 | France . | |
| 2590855 | 6/1987 | France . | |
| 0249910 | 12/1987 | Germany | 280/801.2 |
| 29606521 | 9/1996 | Germany . | |
| 7604742 | 11/1997 | Netherlands | 280/806 |

OTHER PUBLICATIONS

6001 Chemical Abstracts, 115 (1991) Dec. 2, No. 22, columbus, Ohio, U.S. 115: 235783q Combustion mechanism of GAB/AN propellants.

*Primary Examiner*—Brian L. Johnson
*Assistant Examiner*—Gerald Klebe
*Attorney, Agent, or Firm*—Tarolli, Sundheim, Covell, Tummino & Szabo L.L.P.

[57] ABSTRACT

An adjustment device for a deflection fitting of a vehicle safety belt system comprises a rail adapted to be mounted in the vehicle and a slidable carriage which is movable in the rail. The carriage is provided with a detent device for selectively blocking the carriage on the rail. The carriage further comprises a control surface and a locking roller movable on the control surface. The locking roller is moved from a normal release position to a locking position in response to a sudden displacement of the carriage in a downward direction to lock the carriage on the rail.

9 Claims, 4 Drawing Sheets

ADJUSTMENT DEVICE FOR A DEFLECTION FITTING OF A VEHICLE SAFETY BELT SYSTEM

The invention relates to an adjustment device for a deflection fitting of a vehicle safety belt system.

Usually, such an adjustment device has a rail mounted to the vehicle body and a slidable carriage which is movable in the rail and is provided with a detent device for selectively blocking the carriage on the rail.

Such an adjustment device is known from the German Utility Model 296 06 521. It serves to adapt the course of the safety belt optimally to the size of the respective occupant of the vehicle. Problems in the use of such adjustment devices can occur when, in an accident, the slidable carriage is not correctly blocked on the rail by means of the detent device. This problem is further intensified when the safety belt system is provided with a belt tensioner, which in case of a collision pulls the belt slack out of the safety belt system. The forces thereby acting on the deflection fitting can lead to the detent device not blocking the slidable carriage reliably so that the carriage moves downwards on the rail, whereby the effect of the belt tensioner is impaired. In accordance with the above-mentioned utility model, provision is therefore made to arrange a locking catch or a locking plate on the carriage. In the case of a sudden downward displacement of the slidable carriage in the rail the catch is pivoted downwards from a normal release position into a locking position. In this locking position, an edge of the catch wedges itself against the base part or one of the side wings of the rail, whereby the slidable carriage is locked in the rail.

The present invention provides an adjustment device which can be produced at reduced costs and is simpler than the above-mentioned adjustment device disclosed in the prior art. According to the invention, an adjustment device for a deflection fitting of a vehicle safety belt system is provided. The device has a rail adapted to be mounted in the vehicle. A slidable carriage is movable in the rail and is provided with a detent device for selectively blocking the carriage on the rail. The carriage is provided with a control surface. A roller body is movable on the control surface. The roller body is moved from a normal release position to a locking position in response to a rapid displacement of the carriage in a downward direction toward a floor of the vehicle to lock the carriage on the rail. In addition to the simplified configuration, permitted by the use of a roller body, a further advantage is produced in that a roller body responds more quickly than a locking catch to a displacement of the slidable carriage in the rail. This is due to the fact that all of the mass inertia forces acting on the roller body are converted into a displacement of the roller body relative to the slidable carriage, whereas with a locking catch part of the mass inertia forces acting thereon must be supported eccentrically on the slidable carriage in order to produce the moment of rotation by which the locking catch is moved from its release position into its locking position.

The invention is explained hereinbelow with reference to the enclosed drawings, in which.

Figure 1:
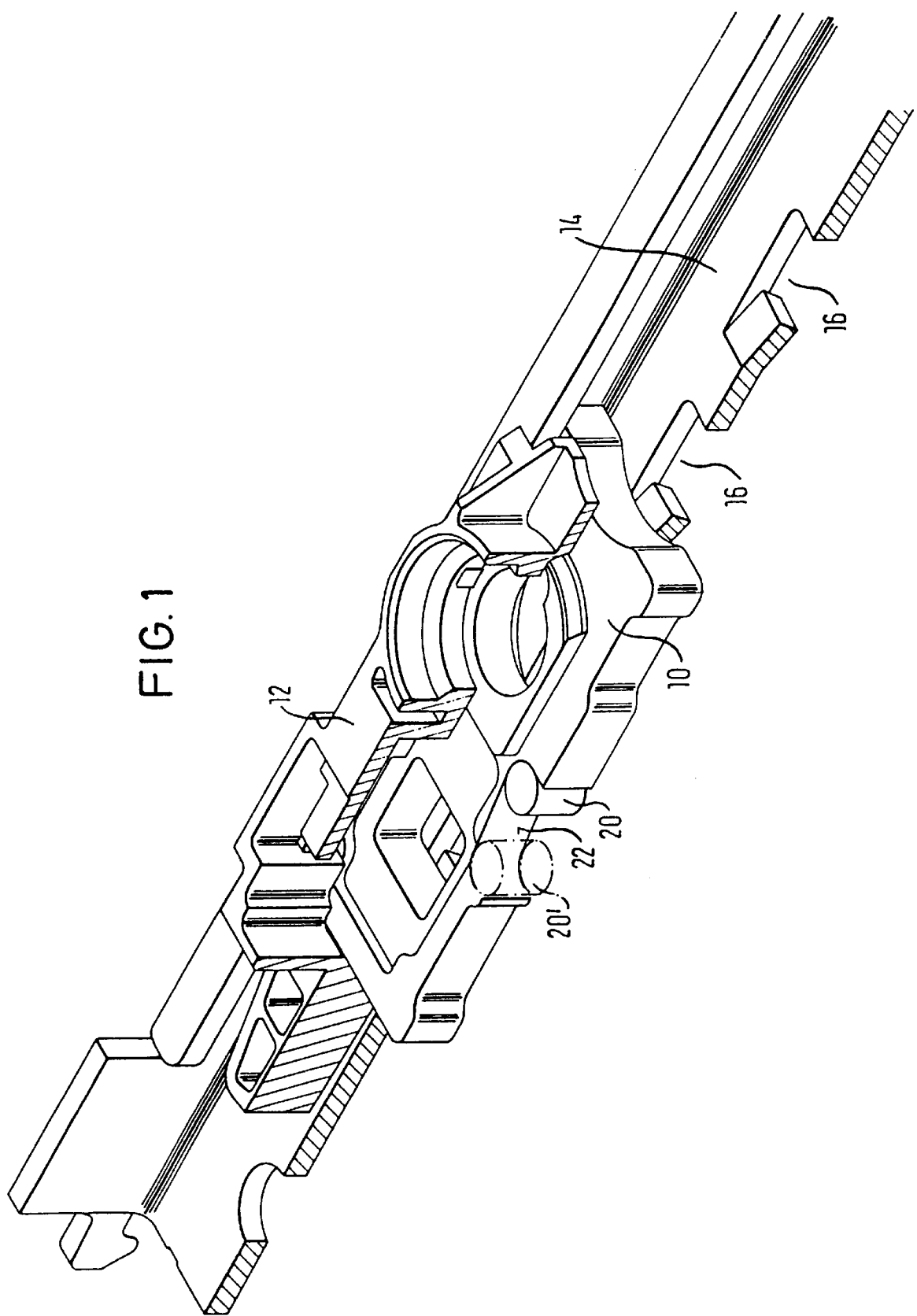
FIG. 1 shows a diagrammatic perspective view of an adjustment device according to the invention, in accordance with a preferred embodiment of the invention.

In FIG. 1 an adjustment device according to the invention is illustrated diagrammatically, in which all the functional parts which are not essential for an understanding of the invention have been omitted. The adjustment device comprises a slidable carriage 10 which is provided with a slidable member 12. The slidable carriage 10 and the slidable member 12 are arranged so as to be movable together in a rail 14 which is mounted to the vehicle body, only one half of which rail is illustrated. The slidable carriage 10 is provided with a detent device 15 (FIG. 3), by which the slidable carriage 10 can be selectively blocked on the rail, by engagement in detent openings 16 of the rail 14.

The slidable carriage 10 is provided with a locking roller 20 which is arranged on one side of carriage 10 opposite a side 21 (FIG. 3) of the rail 14. The locking roller 20 is arranged in a recess in the slidable carriage 10, with a wall section of the wall which delimits the recess forming a control surface 22 which runs obliquely relative to the direction of movement of carriage 10. When the slidable carriage 10 is mounted in the vehicle the control surface 22 is aligned so that at its bottom end it has a greater distance from the opposed face 21 of the rail 14 than at the upper end.

Normally, the locking roller 20 is in a release position illustrated in FIG. 1, in which it does not engage on the rail 14. The slidable carriage 10 is freely movable in the rail 14.

Figure 4:
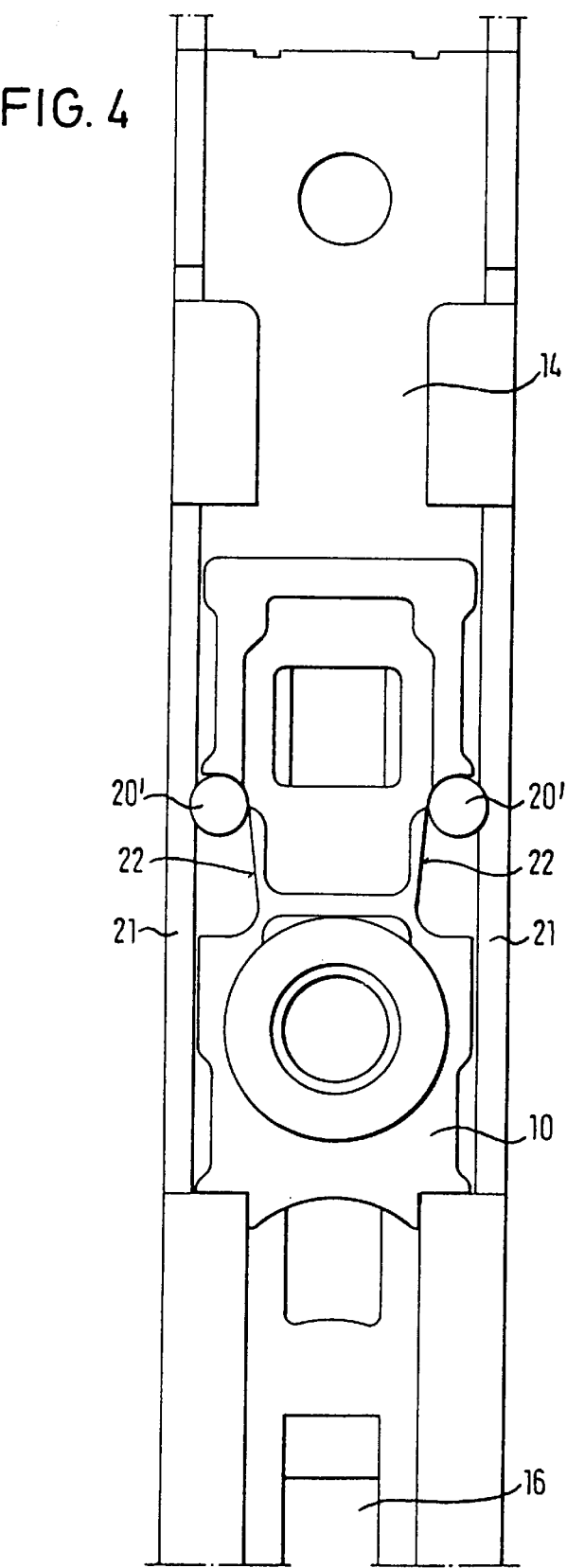
FIG. 4 shows a diagrammatic top view onto the the invention illustrated in FIG. 1, in the locking condition.

When the slidable carriage 10 in the rail 14 is rapidly moved downwards relative to the vehicle, the locking roller 20 owing to its mass inertia lags behind with respect to carriage 10. It therefore moves starting from its release position relative to the carriage in the direction of the locking position illustrated by reference number 20'. With progressive displacement of the carriage 10 in the rail 14, the locking roller wedges itself between the guide surface 22 and the side wing 21 of the rail 14 lying opposite thereto, whereby a further movement of the carriage 10 in the rail 14 is prevented. This condition is illustrated in FIG. 4. The locking by means of the locking roller 20 therefore takes place completely independently of the detent device with which the carriage 10 can be blocked in the detent openings 16, and with an extremely short response time within a short locking distance. Deviating from the illustrated symmetrical arrangement of one locking roller 20 each on each side of the slidable carriage 10, only one locking roller 20 can be used.

Figure 2:
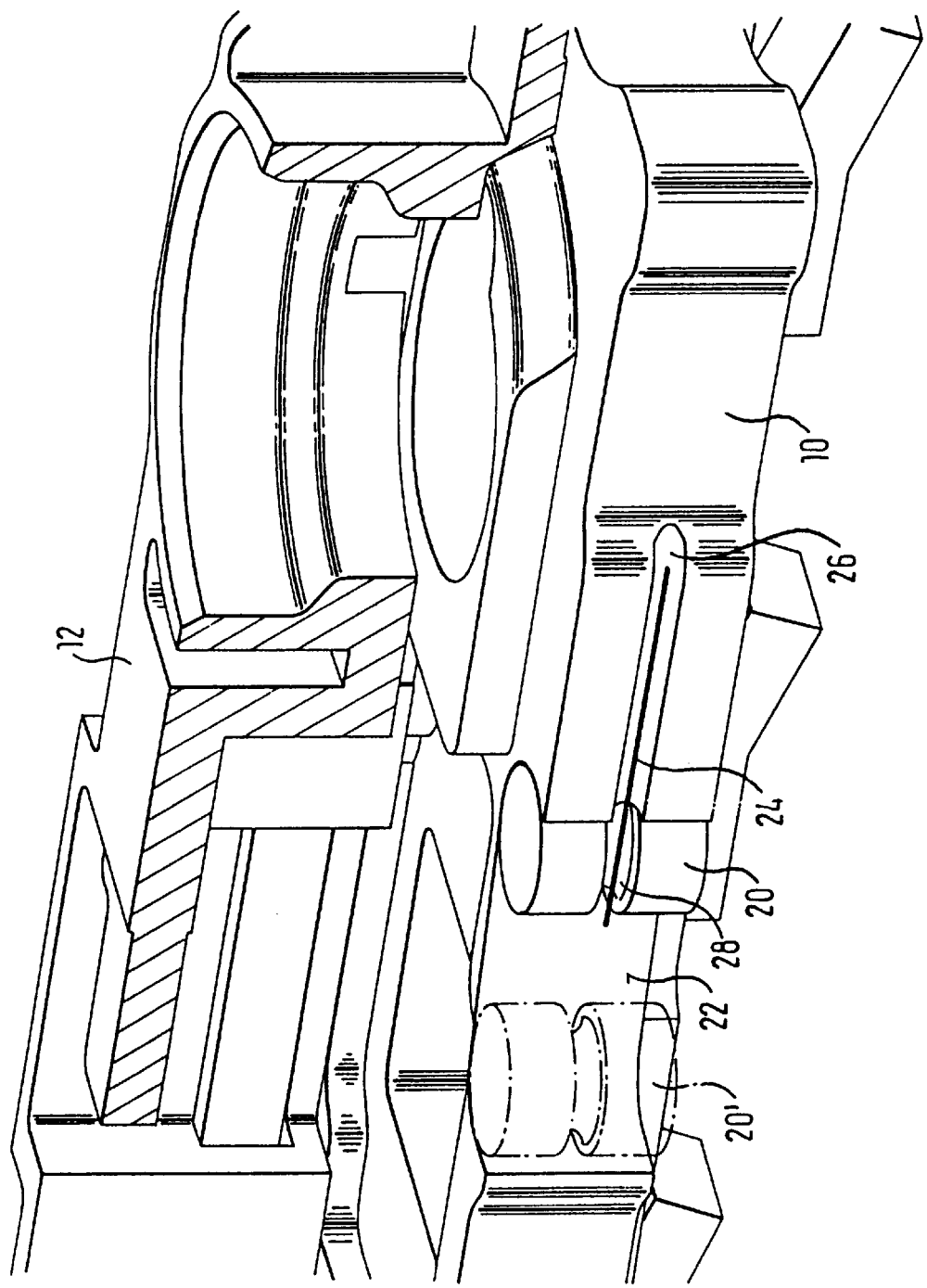
FIG. 2 shows on an enlarged scale a partial view of a variant of the embodiment illustrated in FIG. 1.

In FIG. 2 a modified embodiment is illustrated. The same reference numbers are used for similar elements as in the embodiment of FIG. 1.

Figure 3:
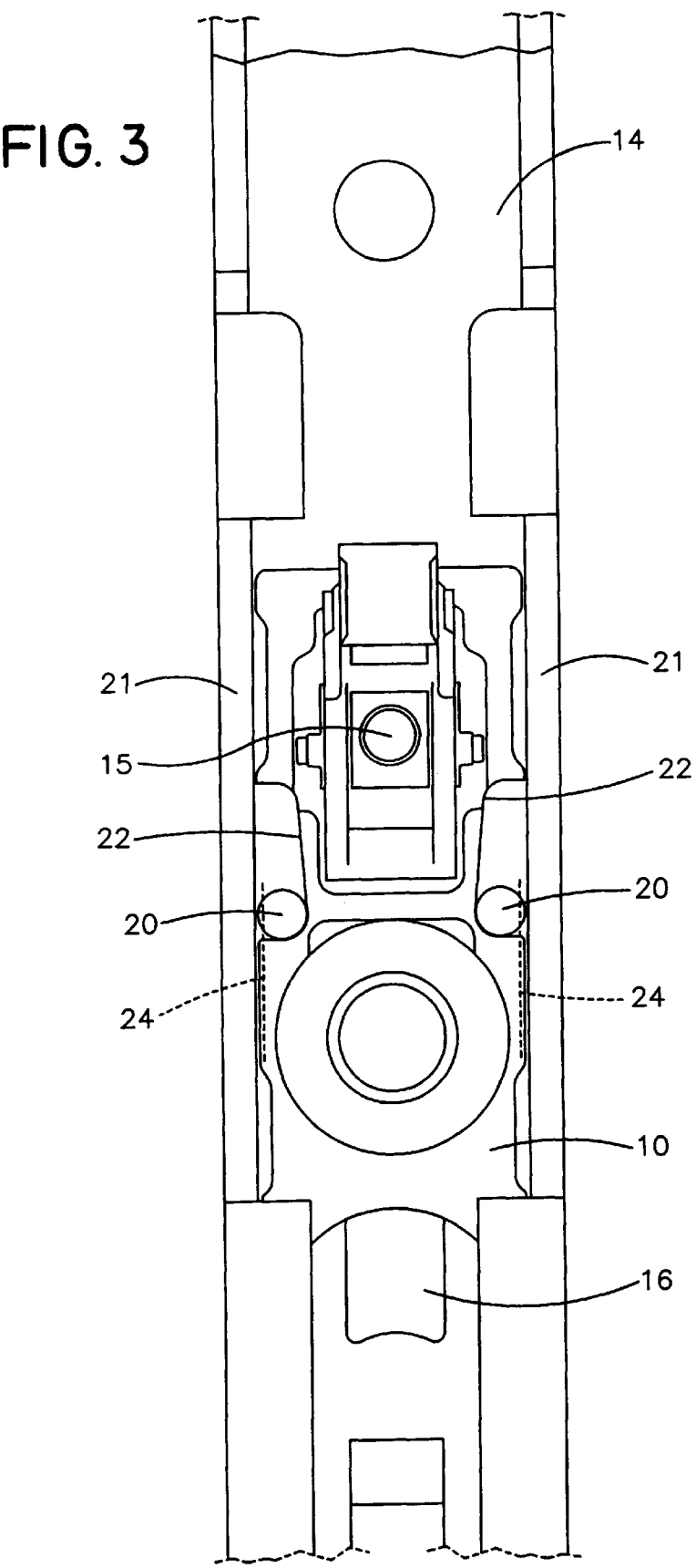
FIG. 3 shows a diagrammatic top view onto the variant of the invention, illustrated in FIG. 2, in the release condition.

The adjustment device illustrated in FIGS. 2 and 3 differs from the embodiment illustrated in FIG. 1 by a spring 24 which holds the locking roller 20 in its release position. This spring 24 consists of a straight spring wire section which is calked in a groove 26 formed on the carriage 10. The spring 24 engages into a circumferential groove 28 which is formed centrally between the two axial ends of the locking roller 20. The length of the spring 24 is dimensioned such that the locking roller 20 leaves the spring 24 when it has moved by a predetermined distance towards its locking position. The function of the spring consists in particular in preventing rattling noises of the locking roller 20.

What is claimed is:

1. An adjustment device for a deflection fitting of a vehicle safety belt system, comprising a rail adapted to be mounted in the vehicle, a slidable carriage which is movable in said rail, a detent device on said carriage for selectively blocking said carriage on said rail, said carriage further comprising a control surface and at least one roller body movable on said control surface and independent of said detent device, said roller body being moved from a normal release position to a locking position in response to a rapid displacement of said carriage in a downward direction toward a floor of the vehicle to lock said carriage on said rail.

2. The adjustment device according to claim 1, wherein said roller body is a cylindrical locking roller.

3. The adjustment device according to claim 2, wherein said locking roller is arranged on a side of said carriage facing a side wing of said rail.

4. The adjustment device according to claim 2, wherein said locking roller is biased by a spring to said release position.

5. The adjustment device according to claim 4, wherein said spring is an elongated wire spring.

6. The adjustment device according to claim 1, wherein said control surface is a ramp and said roller body when in said locking position is wedged between said ramp and a surface portion of said rail lying opposite to said ramp.

7. The adjustment device according to claim 1, wherein a pair of similar roller bodies are arranged symmetrically on said carriage.

8. An adjustment device for a deflection fitting of a vehicle safety belt system, comprising a rail adapted to be mounted in the vehicle, a slidable carriage which is movable in said rail, a detent device on said carriage for selectively blocking said carriage on said rail, said carriage further comprising a control surface and at least one roller body movable on said control surface and independent of said detent device, said roller body being moved from a normal release position to a locking position in response to a rapid displacement of said carriage in a downward direction toward a floor of the vehicle to lock said carriage on said rail, said roller body being biased by a spring to said release position, said spring being an elongated wire spring.

9. An adjustment device for a deflection fitting of a vehicle safety belt system, comprising a rail adapted to be mounted in the vehicle, a slidable carriage which is movable in the rail, a detent device on said carriage further comprising a control surface and at least one roller body movable on said control surface, said roller body being moved from a normal release position to a locking position in response to a rapid displacement of said carriage in a downward direction toward a floor of the vehicle to lock said carriage on the rail;

wherein said roller body is a locking roller, and wherein said locking roller is biased by a spring to said release position, and wherein said spring is an elongated wire spring, and wherein said spring is caulked in a groove in said carriage and said locking roller is provided centrally with a circumstantial groove into which said spring engages, and wherein said spring is disengaged from said locking roller when the locking roller moves from said release position to said locking position.

* * * * *